United States Patent [19]

Rex

[11] Patent Number: 5,743,684
[45] Date of Patent: Apr. 28, 1998

[54] ADJUSTABLE DRILL HOLE JIG FOR CARPENTRY APPLICATIONS

[75] Inventor: Lewis L. Rex, Fraser, Mich.

[73] Assignee: Rex Systems, Inc., Fraser, Mich.

[21] Appl. No.: 736,981

[22] Filed: Oct. 25, 1996

[51] Int. Cl.$^6$ ..................................................... B23B 49/00
[52] U.S. Cl. ........................................ 408/115 R; 408/97
[58] Field of Search ........................ 408/97, 103, 115 R; 33/638, 644, 671

[56] References Cited

U.S. PATENT DOCUMENTS

| | | | |
|---|---|---|---|
| 3,273,426 | 9/1966 | Cleveland | 408/115 R |
| 4,684,299 | 8/1987 | Laliberte | 408/115 R |
| 5,064,319 | 11/1991 | Eriksen | 408/115 R |
| 5,375,949 | 12/1994 | McHenry | 408/115 B |
| 5,507,607 | 4/1996 | Ericksen et al. | 408/115 R |

*Primary Examiner*—Daniel W. Howell
*Attorney, Agent, or Firm*—Peter D. Keefe

[57] ABSTRACT

An adjustable drill hole jig which allows a carpenter easy and quick customization of the drill hole jig to conform to the particular hole positioning required of the drilling job at hand, in particular the drilling of threaded fastener holes into cabinet doors for the purpose of attaching handles thereto. The drill hole jig according to the present invention is composed, generally, of: a base having an L-shaped guide edge, a first guide abutment for restingly engaging a workpiece surface, and a first guide opening; a primary armature having a second guide opening wherein the primary armature is guidably slidable along a first axis in the first guide opening; and a secondary armature guidably slidable along a second axis, which is perpendicular to the first axis, in the second guide opening. The secondary armature is provided with a plurality linearly arranged guide holes for guiding drilling of holes in a workpiece. The first and second armatures are selectively fixable in position relative to the base via threaded fasteners associated with the primary armature.

19 Claims, 3 Drawing Sheets

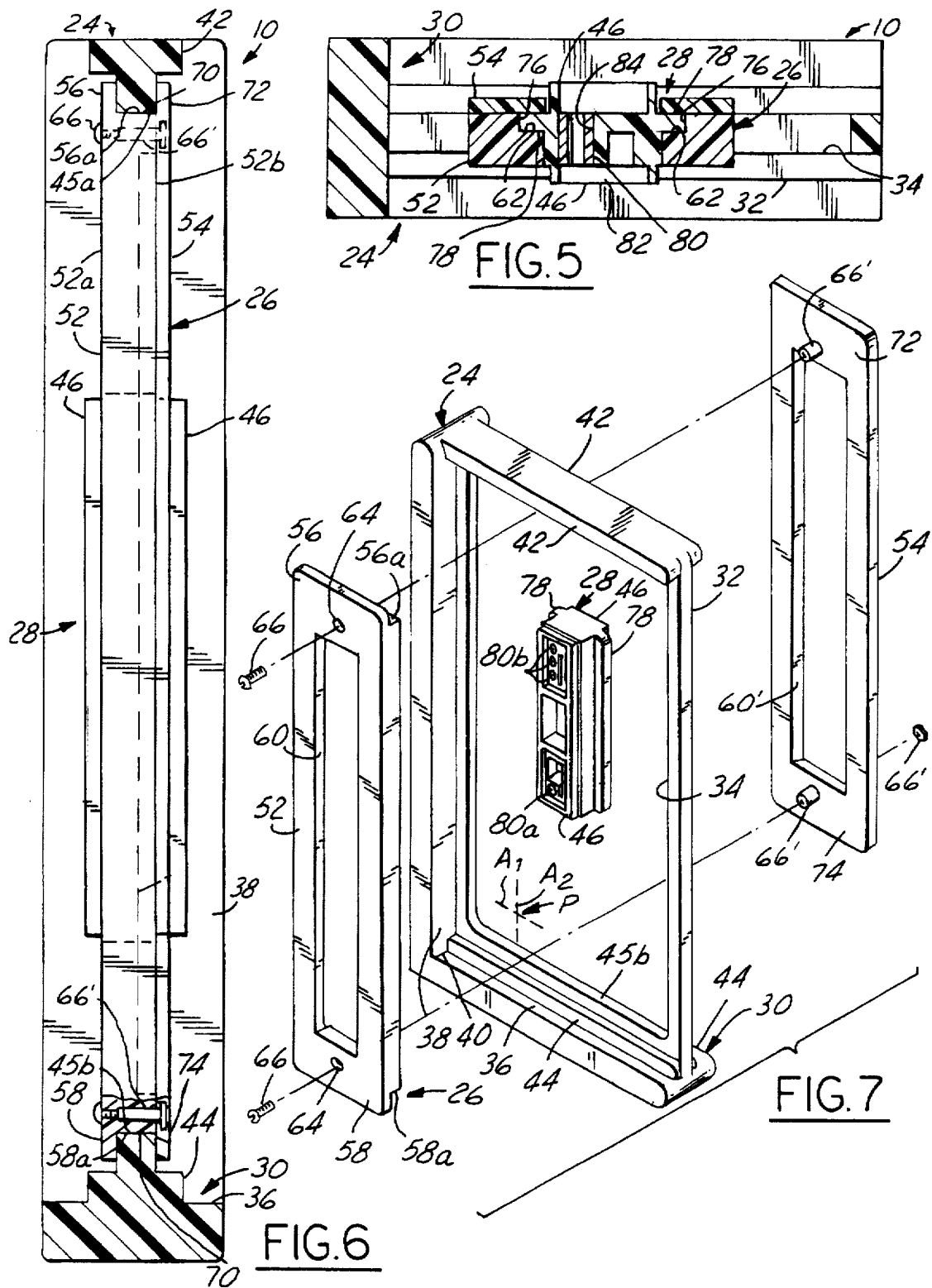

ADJUSTABLE DRILL HOLE JIG FOR CARPENTRY APPLICATIONS

BACKGROUND OF THE INVENTION

1. Field of the Invention

The present invention is related to power tool jigs. More particularly, the present invention relates to an adjustable jig for providing precise location of drill holes in workpieces during carpentry work. Still more particularly, the present invention relates to an adjustable drill hole jig for providing precise location and perpendicularity of threaded fastener holes in cabinet doors during the installation of handles.

2. Description of the Prior Art

Carpenters frequently need to provide drill holes in workpieces in the course of their work. In fine carpentry work, the carpenter must both locate the exact position of the drill holes and then perform the drilling of the drill hole as close to perpendicularity as is possible with respect to the surface of a workpiece. In the case of cabinet doors of the kind used in kitchens, for example, a pair of drill holes are provided in the cabinet doors so that threaded fasteners may respectively pass therethrough to thereby attach a handle to the cabinet door. In this regard, the holes must be precisely located on the door, precisely spaced from each other, and each door must be precisely drilled as each other door, or else the job will be imperfect. Since the cost of each door may be well over one hundred dollars, any drill hole error is intolerable.

Accordingly, what remains needed in the art is an adjustable drill hole jig which allows a carpenter easy and quick customization of the drill hole jig to conform to the drilling job at hand.

SUMMARY OF THE INVENTION

The present invention is an adjustable drill hole jig which allows a carpenter easy and quick customization of the drill hole jig to conform to the particular hole positioning required of the drilling job at hand, in particular the drilling of threaded fastener holes into cabinet doors for the purpose of attaching handles thereto.

The drill hole jig according to the present invention is composed, generally, of: a base having an L-shaped guide edge, a first guide abutment for restingly engaging a workpiece surface, and a first guide opening; a primary armature having a second guide opening wherein the primary armature is guidably slidable along a first axis in the first guide opening; and a secondary armature guidably slidable along a second axis, which is perpendicular to the first axis, in the second guide opening. The secondary armature is provided with a plurality linearly arranged guide holes for guiding drilling of holes in a workpiece, and further is provided with a second guide abutment for firmly engaging the surface of the workpiece to ensure perpendicularity of the guide holes relative thereto. The first and second armatures are selectively fixable in position relative to the base via threaded fasteners associated with the primary armature.

In operation, a carpenter determines the desired location of drill holes in a cabinet door with respect to a selected corner thereof. The carpenter then moves the primary and secondary armatures so that selected guide holes are located at the desired drill hole locations with respect to the guide edge. Next, the carpenter affixes the position of the first and second armatures relative to the base. Thereupon, he places the drill hole jig onto the cabinet door wherein the inside corner of the guide edge mates a selected corner of the cabinet door. The carpenter then proceeds to drill the holes using the guide holes for bit guidance, the resulting holes in the cabinet door now being precisely located and perpendicularly oriented relative to the surface of the cabinet door.

With the drill hole jig now being exactly customized for the drill job at hand, the carpenter next goes to successive cabinet doors, abuts the drill hole jig onto the commonly selected corner of the cabinet door and then drills perfect holes each time. The final result is that each cabinet door has been provided with exactly the same located holes whereby, upon installation of the handles, each and every handle precisely aligns with every other handle.

Accordingly, it is an object of the present invention to provide an adjustable drill hole jag for providing precise locations of drill holes which is exactly reproducible from one workpiece to another with respect to a commonly selected corner thereof.

It is a further object of the present invention to provide an adjustable drill hole jig which provides hole location and hole orientation guidance.

These, and additional objects, advantages, features and benefits of the present invention will become apparent from the following specification.

BRIEF DESCRIPTION OF THE DRAWINGS

FIG. 5 is a partly sectional view of the drill hole jig according to the present invention, seen along line 5—5 in FIG. 2.

FIG. 6 is a partly sectional view of the drill hole jig according to the present invention, seen along line 6—6 in FIG. 2.

FIG. 7 is an exploded perspective view of the drill hole jig according to the present invention.

DETAILED DESCRIPTION OF THE PREFERRED EMBODIMENT

Figure 1:
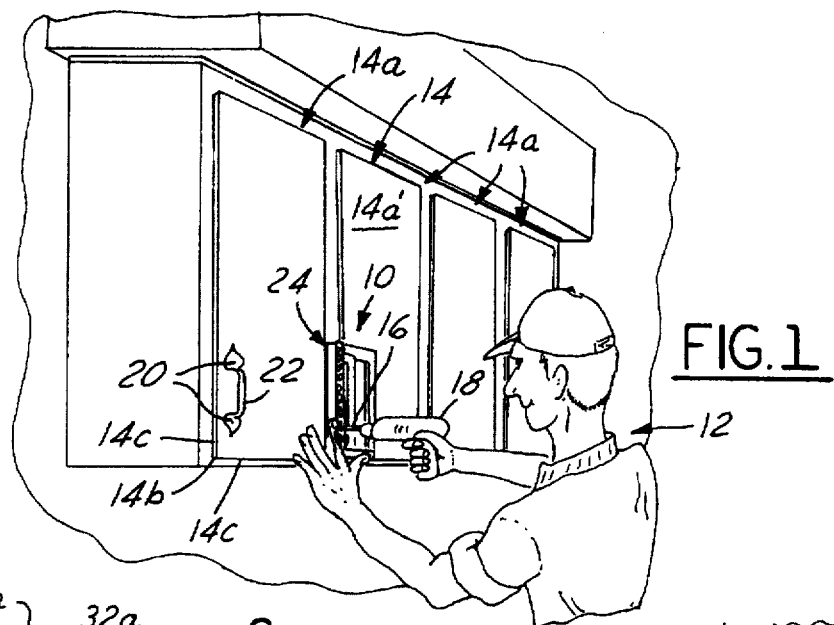
FIG. 1 is a perspective view of the drill hole jig according to the present invention, shown in a typical environment of use.

Referring now to the Drawing, FIG. 1 generally shows the drill hole jig 10 according to the present invention being used by a carpenter 12 to provide drill holes in a workpiece 14 in the form of a cabinet door 14a. In this regard (see in FIGS. 2, 4 and 7), a guide edge of the drill hole jig 10 is placed abuttingly against complementary edges 14c of a corner 14b of the cabinet door 14a and guide holes provide guidance for the bit 16 of a drill 18, wherein the holes drilled into the cabinet door are both precisely located and also precisely perpendicularly oriented relative to the flat surface 14a' of the cabinet door 14a. Each of the four cabinet doors 14a shown in FIG. 1 are being provided with holes for receiving threaded fasteners of handles 20 in a precisely located relationship to a commonly selected corner 14b. The drill hole jig 10 is used successively with each cabinet door 14a to provide exactly similar hole locations in each cabinet door so that all the handles 20 will be in exact alignment with each other.

Figure 2:
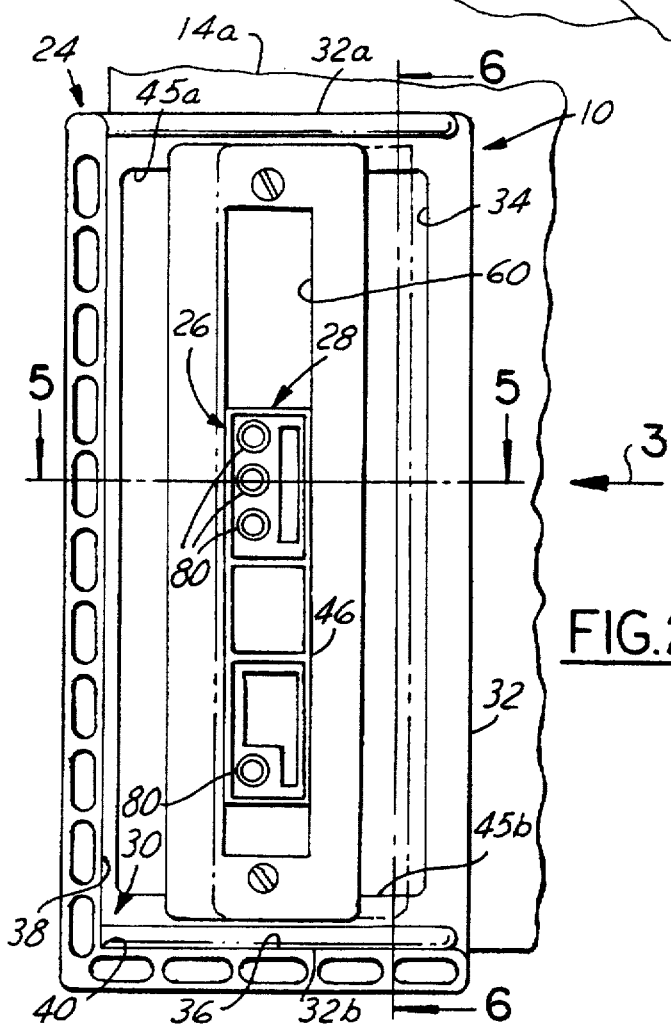
FIG. 2 is a side view of the drill hole jig according to the present invention.
Figure 3:
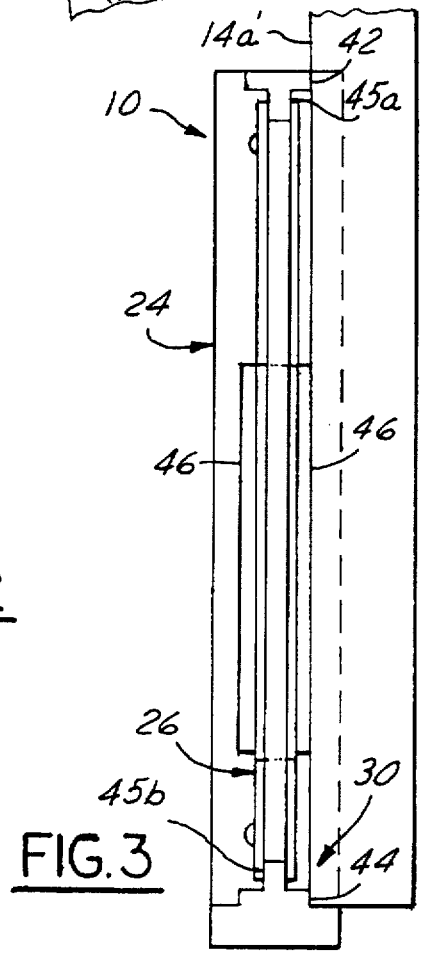
FIG. 3 is an end view of the drill hole jig according to the present invention, seen along line 3 in FIG. 2.
Figure 4:
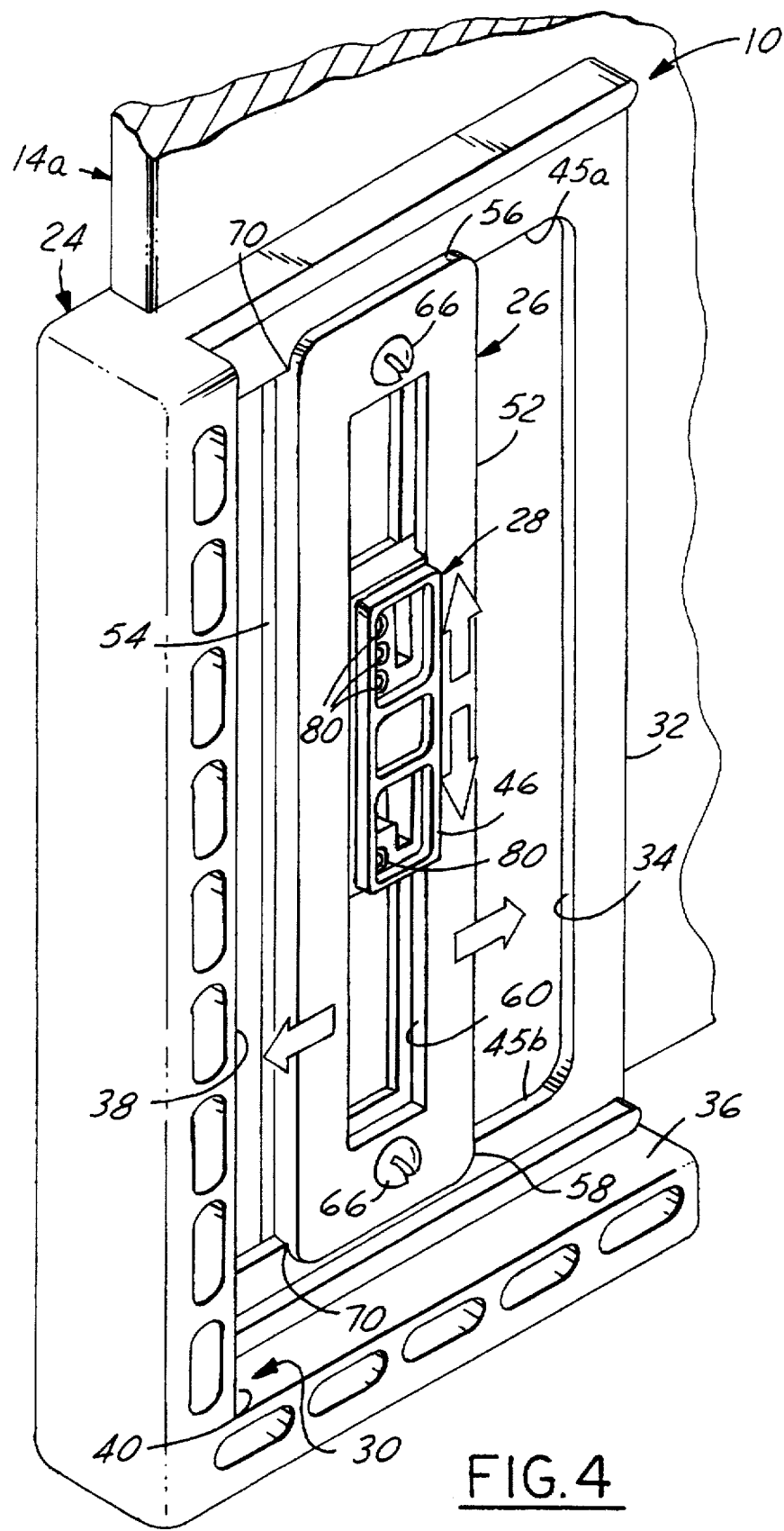
FIG. 4 is a detail perspective view of the drill hole jig according to the present invention, shown guidably located with respect to the complementary edges of a corner of a workpiece.

Referring now additionally to FIGS. 2 through 7, the structure and function of the drill hole jig 10 will be detailed with greater specificity, wherein, as depicted best by FIGS. 4 and 7, the drill hole jig 10 is composed of three major components: a base 24, a primary armature 26 selectively slidable with respect to the base along a first axis $A_1$ and a secondary armature 28 selectively slidable with respect to the primary armature along a second axis $A_2$ which is perpendicular to the first axis, wherein each component is preferably formed of plastic via an injection molding process.

The base 24 includes an L-shaped guide edge 30 and a rectilinearly shaped bracket member 32 having a first guide opening 34 of rectilinear shape formed therein. The guide edge 30 includes a first guide edge leg 36 parallel to the first axis $A_1$ and a second guide edge leg 38 parallel to the second axis $A_2$. The intersection of the first and second guide edge legs 36, 38 forms a right angle guide corner 40. The bracket member 32 is coterminous with, and medially situated at (bisects), the guide edge 30 in the plane P (see FIG. 7) defined by the first and second axes $A_1$, $A_2$. At the top and bottom 32a, 32b of the bracket member 32, spaced from the upper and lower edges 34a, 34b of the first guide opening 34, respective upper and lower first guide abutments 42, 44 are provided which are parallel with the first axis $A_1$. Accordingly, the base 24 has a plurality of guide surfaces which serve in concert for precisely locating the base with respect to a corner and flat surface of a workpiece, as will now be detailed.

As can be understood from reference to FIGS. 2, 3 and 4, the flat surface 14a' of the cabinet door 14a abuts the upper and lower first guide abutments 42, 44, while simultaneously, the guide edge 30, inclusive of the first and second guide edge legs 36, 38 and the guide edge corner 40, abut a selected corner 14b and the complementary edges 14c thereof. The abutment of the upper and lower first guide abutments 42, 44 with the flat surface 14a' of the cabinet door 14a provides a parallel orientation of the bracket member with respect to the flat surface 14a' of the cabinet door 14a. Further, the abutment of the guide edge 30 with the selected corner 14b and the edges 14c of the cabinet door 14a locates the first opening 34 with respect to the selected corner.

Located respectively between each of the upper and lower edges 34a, 34b of the first guide opening 34 and the upper and lower first guide abutments 42, 44 are upper and lower bosses 45a, 45b which are oriented parallel with the first axis $A_1$. The upper and lower bosses 45a, 45b serve to guide sliding movement of the primary armature 26 with respect to the base 24, as will be discussed in detail hereinbelow.

It will be noted that the base 24 is structurally symmetric relative to the plane P. Accordingly, either side of the base 24 may be used to aligningly abut the guide edge 30 and the upper and lower first guide abutments 42, 44 with respect to a cabinet door 14a in the manner hereinabove described.

The primary armature 26 is composed of a main primary armature component 52 and an ancillary primary armature component 54, as seen best by FIG. 7.

The main primary armature component 52 has a front face 52a and an opposite rear face 52b. Upper and lower flanges 56, 58 are provided adjoining the front face 52a, thereby forming respectively adjacent recesses 56a, 58a which adjoin the rear face 52b. A rectilinear second guide opening 60 is formed in the primary guide member 26. As shown by FIGS. 5 and 6, guide grooves 62 are formed on each of the right and left sides of the second opening 60 and communicate therewith. Upper and lower holes 64 are provided for receiving a first constituent of threaded fasteners in the form of screws 66 respectively therethrough.

The ancillary primary armature component 54 is planar, having a complementary portion of the second guide opening 60' formed therein. Alignably with respect to the holes 64, is a second constituent of the threaded fasteners in the form of screw posts 66'. As best seen in FIG. 6, each of the screw posts 66' have a head fixedly anchored in the ancillary primary armature component 54 and a cylindrical shank having inside threads for threadably engaging the screws 66.

When the main and ancillary primary armature components 52, 54 are joined together by the threaded fasteners 66, 66', the recesses 56a, 58a become first guide slots 70, demarcated by the upper and lower flanges 56, 58 and the upper and lower ends 72, 74 of the ancillary primary armature component 26. The first guide slots 70 are oriented parallel with respect to the first axis $A_1$. Further, when the main and ancillary primary armature components 52, 54 are joined together, the guide grooves 62 become second guide slots 76. The second guide slots 76 are oriented parallel with respect to the second axis $A_2$. In order for the primary armature 26 to be connected with the base 24, the main and ancillary primary armature components 52, 54 are joined together so that the upper and lower bosses 45a, 45b of the base 24 are guidingly received into the recesses 56a, 56b.

The secondary armature 28 is rectilinearly shaped to fit into the second guide opening 60, 60' and be slidable therein along the second axis $A_2$, but not the first axis $A_1$. The secondary armature 28 is provided with opposing right and left wings 78 which are structured to be receivable into the second guide slots 76 of the primary armature 26. In this regard, the thickness of the wings 78 is just slightly more than the thickness of the upper and lower bosses 45a, 45b so that when the threaded fasteners 66, 66' are tightened, whereupon the main and auxiliary primary armature components are tightly pressed together, not only will the primary armature be fixed in position by friction with respect to the upper and lower bosses, the secondary armature 28 will also be fixed in position by friction with respect to the primary armature 26.

The secondary armature 28 is mounted to the primary armature 26 via the right and left wings 78 being received into the secondary guide slots 70 at the time the main and ancillary primary armature components 52, 54 are joined.

The secondary armature 28 is provided with a series of guide holes 80, wherein when the primary and secondary armatures are mounted onto the base 24, the guide holes are oriented normal to the plane P. Preferably, each guide hole 80 includes a hardened metallic bushing 82 press-fit into respective apertures 84 formed in the secondary armature 28. Preferably, the guide holes 80 are linearly aligned and arranged so as to provide several relative hole spacings to thereby accommodate a spectrum of sizes of handles 22. As depicted in the Drawing, it is preferred for the hole guides 80 to include a main guide hole 80a and a plurality of satellite guide holes 80b arranged linearly with respect to the main guide hole, and further, arranged in a group spaced distally from the main guide hole. For example, the main guide hole 80a may be spaced from the satellite guide holes 80b, wherein a nearest satellite guide hole is spaced 3 inches on center from the main guide hole, the next satellite guide hole is spaced 3.5 inches on center from the main guide hole, and the farthest satellite guide hole is spaced 4 inches on center from the main guide hole.

In order that the secondary armature be precisely oriented onto the flat surface 14a' of the cabinet door 14a so that the guide holes 80 are exactly perpendicular thereto, a second guide abutment 46 is provided on the secondary armature. The second guide abutment 46 is located peripherally around the secondary armature on both of the opposing sides thereof. In this regard, the second guide abutment 46 cooperates with each of the upper and lower first guide abutments, wherein the second guide abutment preferably projects about 0.005 inch beyond the upper and lower first guide abutments 42, 44. Accordingly, when the carpenter presses the drill hole jig onto the flat surface 14a', the second guide abutment will firmly engage the flat surface, while the upper and lower first guides surfaces will also restably engage the flat surface. Thus, upper and lower first guide abutments and second guide abutment serve to assure that the orientation of the bracket 32 is parallel with respect to the flat surface and, particularly as a result of the second guide abutment, the orientation of the guide holes 80 is perpendicular to the flat surface.

It will be noted that the guide edge 30, the upper and lower first guide abutments 42, 44 and the second guide abutment are symmetrical about the plane P so that the guide hole jig 10 is fully reversible in operation with respect to the corners of a workpiece.

Operation will now be discussed, with reference being directed in particular to FIGS. 1, 4 and 7.

As indicated hereinabove, the drill hole jig 10 is assembled via the main primary armature component being joined with the ancillary primary armature component, wherein simultaneously the right and left wings of the secondary armature are received into the second guide slots and the upper and lower bosses of the bracket member are received into the first guide slots.

The carpenter first selects which corner is the commonly selected corner at which the handles of the cabinet doors is to be attached. The carpenter then measures the locations of the desired holes with respect to the complementary edges 14c of the selected corner 14b. The carpenter selects which of the satellite guide holes matches the spacing required for the particular handles being installed. The carpenter then moves the primary armature along the first axis until the guide holes 80 are at the same measured distance from the second guide edge leg 38 as the desired holes were measured to be from the complementary edge of the cabinet door. Next, the carpenter moves the secondary armature along the second axis until the guide holes 80 (when the main guide hole correctly located, the proper satellite guide hole is also automatically correctly located) are at the same measured distance from the first guide edge leg 36 as the desired holes were measured to be from the complementary edge of the cabinet door. Alternatively, the carpenter could reverse the order of armature movements. The threaded fasteners 66, 66' are now tightened to thereby affix the positions of the first and second armatures relative to the base. In this regard, the thickness of the upper and lower guide bosses in relation to the thickness of the first guide slots and the thickness of the right and left wings in relation to the thickness of the second guide slots provides frictional binding of the upper and lower bosses and the right and left wings when the threaded fasteners are tightened.

In order to perform hole drilling into a cabinet door for the threaded fasteners of the handles thereof, the carpenter lays the drill hole jig 10 onto the flat surface of the cabinet door, wherein the upper and lower first guide abutments and the second guide abutment abut the flat surface. Then moves the guide edge into abutment with a selected corner and its complementary edges of the cabinet door. Now, the first guide opening overlays the drilling site.

Next, the carpenter aligns the bit 16 of the drill 18 with the master guide hole and causes the bit to enter down the master guide hole and then commences to guidingly drill through the cabinet door. This process is repeated for the satellite guide hole (of course, either guide hole could have been used firstly). In regard to bit guidance, it is understood that the bit used to drill the holes for the threaded fasteners of the handles is of a generally standard size, such as for example a three-eighths of an inch diameter bit, wherein the inside diameter of the bushings is similarly sized such as to guidably receive the bit therethrough.

The carpenter then goes on to the next cabinet door, repeating the aforesaid drilling operation without adjusting the positions of the first and second armatures relative to the base. The finished job will provide perfectly aligned and uniformly located handles, each threaded fastener hole of the handles being perpendicular to the flat surface of the cabinet door and each hole being located the same in relation to the respective selected corner thereof.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An adjustable drill hole jig for providing guidance during drilling by a bit of a drill, said adjustable drill hole jig comprising:

a base having right angle guide edge means for providing a first abutment in a first plane;

a first armature slidably movable with respect to said base along a first axis;

a second armature slidably movable with respect to said base along a second axis perpendicular to said first axis, said second armature having a plurality of guide holes formed therein, each guide hole of said plurality of guide holes being oriented perpendicular to said plane;

means for guiding slidable movement of said first armature with respect to said base along said first axis;

means for guiding slidable movement of said second armature with respect to said base along said second axis;

abutment means connected with at least one of said base and said secondary armature for providing a second abutment perpendicular with respect to said plane; and immobilizing means for selectively immobilizing said first and second armatures with respect to said base;

wherein said first axis is normal to said second axis, and wherein said plane is formed by an intersection of said first and second axes.

2. The adjustable drill hole jig of claim 1, wherein each guide hole of said plurality of guide holes is defined by a metallic bushing connected with said second armature.

3. The adjustable drill hole jig of claim 2, wherein said plurality of guide holes comprise:

a main guide hole;

and a plurality of satellite guide holes arranged linearly with respect to said main guide hole, said plurality of satellite guide holes being arranged in a group spaced distally from said main guide hole.

4. The adjustable drill hole jig of claim 1, wherein said secondary armature has a first side and an opposite second side, wherein each of said first and second sides of said secondary armature have a periphery; wherein said abutment means comprises a guide abutment located at said periphery.

5. The adjustable drill hole jig of claim 1, wherein said base further comprises:

said right angle guide edge means comprising a guide edge having a first guide edge leg oriented along said first axis and a second guide edge leg oriented along said second axis; and a bracket member connected with said guide edge, said bracket member having a first opening formed therein, said bracket member being oriented parallel to said plane, said bracket member having a top, an opposite bottom, a right side and an opposite left side, said bottom adjoining said second guide edge leg, wherein said first armature is received in said first opening, wherein said first armature is slidable in said first opening along said first axis;

wherein said abutment means comprises:

an upper first guide abutment at said top of said bracket member; and a lower first guide abutment at said bottom of said bracket member.

6. The adjustable drill hole jig of claim 5, wherein said secondary armature has a first side and an opposite second side, wherein each of said first and second sides of said secondary armature have a periphery; wherein said abutment means further comprises a second guide abutment located at said periphery.

7. The adjustable drill hole jig of claim 6, wherein said first armature has formed therein a second opening, said second armature being received in said second opening, wherein said second armature is slidable in said second opening along said second axis.

8. The adjustable drill hole jig of claim 7, wherein said base is structurally symmetric about and bisected by said plane, wherein said guide edge is bisected by said bracket member, wherein each of said upper and lower first guide abutments and said second guide abutment are located symmetrically on each of said right and left sides of said bracket member.

9. The adjustable drill hole jig of claim 8, wherein said second guide abutment is located a first distance from said plane, wherein said upper and lower first guide abutments are located a second distance from said plane, and wherein said first distance is greater than said second distance.

10. The adjustable drill hole jig of claim 8, wherein said first armature has an upper end and an opposite lower end; wherein said first opening has an upper end and an opposite lower end; wherein said means for guiding slidable movement of said first armature comprises:

an upper first guide slot formed in said first armature at said upper end thereof;

a lower first guide slot formed in said first armature at said lower end thereof;

an upper boss connected with said bracket member at said upper end of said first opening; and a lower boss connected with said bracket member at said lower end of said first opening;

wherein said upper boss is guidably received in said upper first guide slot, and wherein said lower boss is guidably received in said lower first guide slot.

11. The adjustable drill hole jig of claim 10, wherein said second armature has a right end and an opposite left end; wherein said second opening has a right end and an opposite left end; wherein said means for guiding slidable movement of said second armature comprises:

a right second guide slot formed in said first armature at said right end of said second opening;

a left second guide slot formed in said first armature at said left end of said second opening;

a right wing connected with said second armature at said right end thereof;

a left wing connected with said second armature at said left end thereof;

wherein said right wing is guidably received in said right second guide slot, and wherein said left wing is guidably received in said left second guide slot.

12. The adjustable drill hole jig of claim 11, wherein said primary armature comprises:

a main primary armature component; and an auxiliary primary armature component selectively connected with said main primary armature component;

wherein connecting together said main and auxiliary primary armature components provides trapping of said upper and lower bosses in said upper and lower first guide slots and provides trapping of said right and left wings in said right and left second guide slots;

wherein said main and auxiliary primary armature components are selectively connected together and selectively pressed mutually together by said immobilizing means; and wherein when said main primary and auxiliary armature components are tightly pressed mutually together, said primary and secondary armatures become slidably immobilized relative to said base.

13. The adjustable drill hole jig of claim 12, wherein said immobilizing means comprises a plurality of threaded fasteners.

14. The adjustable drill hole jig of claim 13, wherein each guide hole of said plurality of guide holes is defined by a metallic bushing connected with said second armature; further wherein said plurality of guide holes comprise:

a main guide hole;

and a plurality of satellite guide holes arranged linearly with respect to said main guide hole, said plurality of satellite guide holes being arranged in a group spaced distally from said main guide hole.

15. The adjustable drill hole jig of claim 14, wherein said second guide abutment is located a first distance from said plane, wherein said upper and lower first guide abutments are located a second distance from said plane, and wherein said first distance is greater than said second distance.

16. An adjustable drill hole jig for providing guidance during drilling of a bit of a drill, said adjustable drill hole guide comprising:

a base comprising:

a guide edge having a first guide edge leg oriented along a first axis and a second guide edge leg oriented along a second axis normal to said first axis;

a bracket member connected with said guide edge, said bracket member having a first opening formed therein, said bracket member being oriented parallel to a plane formed by an intersection of said first and second axes; and first abutment means located on said bracket member for providing a first resting surface perpendicular with respect to said plane;

a first armature located in said first opening and slidably movable therein along said first axis, said first armature having a second opening formed therein;

a second armature located in said second opening and slidably movable therein along said second axis, said second armature having a plurality of guide holes formed therein, each guide hole of said plurality of guide holes being oriented perpendicular to said plane, wherein said secondary armature has a first side and an opposite second side, wherein each of said first and second sides of said secondary armature have a periphery;

second abutment means located at said periphery for providing a second resting surface perpendicular with respect to said plane;

means for guiding slidable movement of said first armature with respect to said bracket member along said first axis;

means for guiding slidable movement of said second armature with respect to said first armature along said second axis; and means for selectively immobilizing said first and second armatures with respect to said base.

17. The adjustable drill hole jig of claim 16, said bracket member having a top, an opposite bottom, a right side and an opposite left side, said bottom adjoining said second guide edge leg; wherein said first abutment means comprises:

an upper first guide abutment at said top of said bracket member; and a lower first guide abutment at said bottom of said bracket member;

wherein said base is structurally symmetric about and bisected by said plane, wherein said guide edge is bisected by said bracket member, wherein each of said upper and lower first guide abutments and said second guide abutment means are located symmetrically on each of said right and left sides of said bracket member.

18. The adjustable drill hole jig of claim 17, wherein said second abutment means is located a first distance from said plane, wherein said upper and lower first guide abutments are located a second distance from said plane, and wherein said first distance is greater than said second distance.

19. The adjustable drill hole jig of claim 18, wherein each guide hole of said plurality of guide holes is defined by a metallic bushing connected with said second armature, wherein said plurality of guide holes comprise:

a main guide hole;

and a plurality of satellite guide holes arranged linearly with respect to said main guide hole, said plurality of satellite guide holes being arranged in a group spaced distally from said main guide hole.

* * * * *